US006426139B1

(12) United States Patent
Ezra

(10) Patent No.: US 6,426,139 B1
(45) Date of Patent: Jul. 30, 2002

(54) STICKER BLANK FOR ATTACHMENT TO WRITING IMPLEMENTS

(75) Inventor: Jamil Ezra, New York, NY (US)

(73) Assignee: Funky Girlz Production, Clifton, NJ (US)

( * ) Notice: Subject to any disclaimer, the term of this patent is extended or adjusted under 35 U.S.C. 154(b) by 0 days.

(21) Appl. No.: 09/469,992

(22) Filed: Dec. 22, 1999

(51) Int. Cl.$^{7}$ .................................................. B32B 7/12

(52) U.S. Cl. ........................ 428/343; 428/347; 428/187; 428/41.7; 428/41.8; 428/100

(58) Field of Search ................................ 428/343, 347, 428/187, 41.7, 41.8, 100

(56) References Cited

U.S. PATENT DOCUMENTS

| | | | | | |
|---|---|---|---|---|---|
| D3,370 | S | * | 2/1869 | Glidden et al. | |
| D7,159 | S | * | 2/1874 | Manville et al. | |
| D37,463 | S | * | 6/1905 | Wagner | |
| D54,836 | S | * | 4/1920 | Duane | |
| 1,713,380 | A | * | 5/1929 | Green | |
| 1,961,460 | A | * | 6/1934 | Slatis et al. | 40/21 |
| D129,474 | S | * | 9/1941 | Forsman | |
| 2,879,567 | A | * | 3/1959 | O'Connell | 24/5 |
| 3,462,865 | A | * | 8/1969 | Gouner | 40/21 |
| 3,994,085 | A | * | 11/1976 | Groselak et al. | 40/21 |
| 4,101,032 | A | * | 7/1978 | Obidniak | 206/457 |
| 4,312,523 | A | * | 1/1982 | Haines | 283/18 |
| 4,679,034 | A | * | 7/1987 | Kamada | 340/567 |
| 4,974,430 | A | * | 12/1990 | Turner | 63/12 |
| 5,195,783 | A | * | 3/1993 | Lavoie | 283/75 |
| 5,279,057 | A | * | 1/1994 | Merlin et al. | 40/630 |
| 5,318,817 | A | * | 6/1994 | Ohno et al. | 428/40 |
| 5,549,950 | A | * | 8/1996 | Murolo | 428/41.7 |
| 5,758,443 | A | * | 6/1998 | Pedrazzini | 40/633 |

* cited by examiner

*Primary Examiner*—Blaine Copenheaver
*Assistant Examiner*—Nai Vo
(74) *Attorney, Agent, or Firm*—Sofer & Haroun, LLP

(57) ABSTRACT

An adhesive blank for decorating articles such as pencils and the like. In one embodiment, the sticker has a first decal and a second decal that are connected together by a bridge. The sticker is preferably symmetrical about a central axis. One surface of the sticker is provided with an adhesive that is exposed when a protective backing sheet is removed. Thus, upon wrapping the bridge about an appropriately sized object, the decals meet in even alignment to create a decorative tag.

10 Claims, 4 Drawing Sheets

STICKER BLANK FOR ATTACHMENT TO WRITING IMPLEMENTS

FIELD OF THE INVENTION

This invention relates to an article for affixing to items such as pencils and pens to create a decorative tag.

BACKGROUND OF THE INVENTION

Ornamental articles in the form of stickers are well known in the prior art. Such stickers are typically formed from a suitably pliable sheet of material, such as paper or plastic, that has an adhesive layer on one of its sides. The adhesive is often covered by a protective backing sheet that may be peeled off to expose the adhesive. After removing the protective layer, the sticker may be applied to a desired surface.

Some stickers are configured to adorn specific surfaces or objects. For example, a wide variety of stickers in various shapes and sizes are used by manufacturers of goods to denote brand names and similar information. Likewise, bumper stickers are sized so that they can be applied to the bumper of automobile. Often these stickers include a political message or a statement of some type. Other stickers are used solely for decorative purposes. For example, it is popular among children to collect stickers that can then be used to decorate notebooks and other articles.

Typically, stickers are designed to be used on two dimensional surfaces. However, at least one patent discloses decorative stickers that can be used in conjunction with three dimensional objects. Specifically, U.S. Pat. No. 4,101,032 to Obidniak discloses a sticker for use on packages and the like. The sticker is formed from a pliable sheet of material that is shaped so as to represent a fanciful character. One surface is printed with a corresponding fanciful character. Two elongated arms—each having a hand-like shape at their ends—extend from the body of the ornamental article. Each hand-like portion includes a means to affix the ornamental article to a package. When applied to a package, the ornamental article looks as though it is holding the package.

The sticker described in Obidniak is not designed to fully wrap around an article so that portions of the sticker may be attached to one another to form a decorative tag. Instead, the entire surface of the sticker is solely applied to the article that it decorates. This prior art sticker can be used in combination with an article that has a relatively small circumference so that when applied, portions of the sticker extend away from the article. However, because the sticker is not symmetrical, its opposite sides do not align with one another. Thus, the gummy surfaces of the sticker are left uncovered and the general appearance of the tag is poor.

Other stickers are known in the prior art that are designed to be wrapped around or affixed to a surface that is not flat. For instance, U.S. Pat. No. 3,994,085 to Groselak et al. discloses a baggage tag assembly formed from a single continuous sheet of material. The tag can be fastened to the handle of a piece of baggage by means of adhesive which allows the tag to be affixed to itself. This invention does not disclose a tag that is non-movably attached to an object. Rather, the tag in Groselak can be moved laterally along a baggage handle and can be rotated as well. Furthermore, as with Obidniak, because the sticker is not symmetrical, it cannot be used to create a flap that projects from the article.

Thus there is a need for an ornamental adhesive blank that can be used in conjunction with articles such as writing instruments and the like to form a decorative tag.

OBJECTS AND SUMMARY OF THE INVENTION

It is thus a general object of the present invention to provide an ornamental adhesive blank that is suitable for decorating a pencil or other similar article.

A more specific object of the present invention is to provide an ornamental adhesive blank having decals connected together by a bridge, where the decals mirror one another so that they may be evenly aligned when the sticker is applied to an article.

It is another object of the present invention to provide an ornamental adhesive blank that is configured to display an image blank.

It is another object of the invention to provide an ornamental adhesive blank that is simple and inexpensive to manufacture.

Thus, according to one embodiment of the invention, an ornamental adhesive blank of pliable sheet material is provided for decorating an object having a central axis and a circumferential surface area. The ornamental adhesive blank comprises a central bridge portion having first and second ends. A first decal is coupled to the first end of said central bridge portion. A second decal is coupled to the second end of the central bridge portion. The second decal is formed in the shape of a mirror image of the first decal. Thus, when the second adhesive side of the central bridge portion is wrapped about the circumferential surface area of the object, the second adhesive sides of the first and second decals contact one another to form a two-sided ornamental decal offset from the central axis of the object.

The above description sets forth rather broadly the more important features of the present invention in order that the detailed description thereof that follows may be understood, and in order that the present contributions to the art may be better appreciated. Other objects and features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

BRIEF DESCRIPTION OF THE DRAWINGS

In the drawings in which like reference characters denote similar elements throughout the several views.

DETAILED DESCRIPTION OF THE INVENTION

Figure 1:
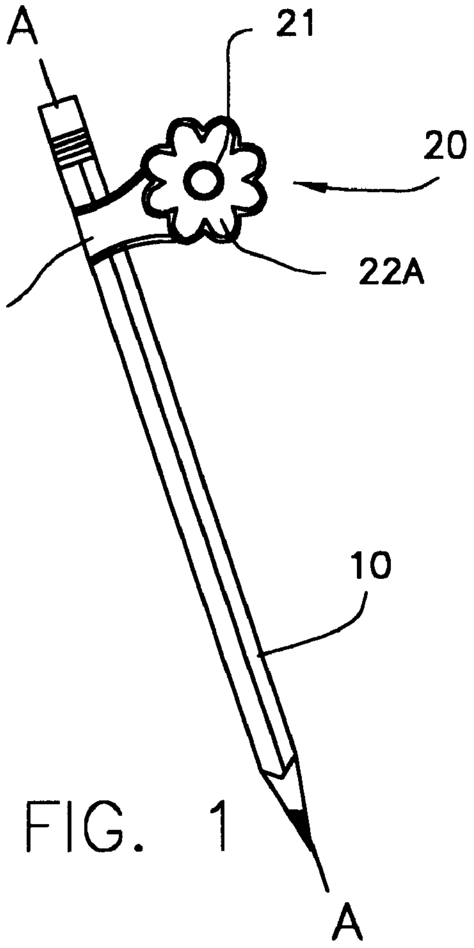
FIG. 1 is a perspective view of an ornamental adhesive blank affixed to a pencil according to one embodiment of the invention.
Figure 2:
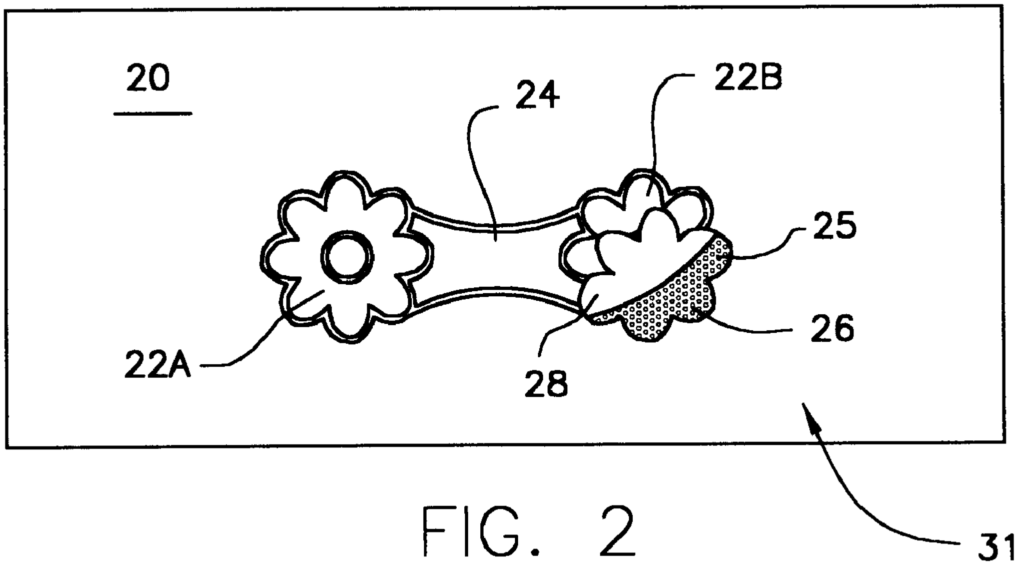
FIG. 2 is a rear view of the ornamental adhesive blank shown in FIG. 1 according to one embodiment of the invention.

The present invention, in accordance with one embodiment, relates to a ornamental adhesive blank 20, illustrated in FIGS. 1 and 2, that can be used to decorate writing implements such as pencils, pens, markers or the like. Although a pencil 10 is shown, it is to be understood that the invention is not limited in this respect, and that any cylindrical or tubular article or any article having a central axis can be used in place of pencil 10. For instance, blank 20 can be attached to shoe laces, belt loops, key chains, toothbrushes, eyeglasses, hair accessories, among many other items not here listed.

In one embodiment, blank 20 which is preferably a single piece of material consists of three portions: a first decal 22*a*, a second decal 22*b*, and a bridge portion 24. The two surfaces of blank 20 are a first ornamental side 21 and a second adhesive side 25. As shown in FIG. 2, the shape of first decal 22*a* is a mirror image of the shape of second decal 22*b*. With continued reference to FIG. 2, blank 20 is shown in more detail. In one embodiment, blank 20 includes an adhesive layer 26 over the entire surface of second adhesive side 25. In another embodiment, adhesive layer 26 does not cover bridge 24. In other embodiments, adhesive layer 26 covers only first decal 22*a* or second decal 22*b*.

The adhesive used may be any of a number of commercially available adhesives but is preferably selected from a class of adhesives that are readily sealable in the first instance upon application. Preferably, blank 20 is reusable in that adhesive layer 26 is formulated so that the adhesive retains its gummy characteristics after it is repositioned by separating the first seal. A protective backing sheet 28 is disposed on adhesive layer 26 so as to prevent blank 20 from being unintentionally affixed to an undesired surface. Instead of pressure-sensitive adhesive, in another embodiment, a hook and loop fastener may used.

Blank 20, itself, is preferably formed from a soft, flexible plastic material that provides a good printing surface. One such material appropriate for this application is polyester. However, blank 20 can also be formed from paper or other similar materials. A printed design is disposed upon first ornamental side 21. In FIG. 1 this design is in the form of a flower. However, such designs are limited only by one's imagination. Decals 22*a* and 22*b* may have identical or similar designs or they each may have totally different printed matter thereupon. For example, decal 22*a* may display the front of a person's head while decal 22*b* may display the rear of a person's head. Preferably, in all cases, the printed design reflects the shape in which decals 22*a* and 22*b* have been cut. For example, in FIG. 1, decal 22*a* represents a flower in shape and the printed material on first ornamental side 21 reflects a like theme.

The printed design on decals 22*a* and 22*b* may also impart information to a user or any other person who comes in contact with the object on which blank 20 is attached. For example, blank 20 may make use of color and/or symbols to clearly indicate the type of object on which it is attached. In one embodiment, common first names are printed on decals 22*a* and 22*b* so that the owner of the object is identified. In another embodiment, colors may identify objects having similar appearance. For example, pencils containing various types of graphite, e.g., different hardnesses, may be identified using color coded blanks 20. This may be useful to an illustrator who employs a number of pencils that are not easily distinguished from one another.

The first step in attaching blank 20 to an object is to remove protective backing 28 from sheet 31 to expose adhesive layer 26. Central bridge portion 24 is then applied to the object such as pencil. 10 in FIG. 1. Upon wrapping bridge 24 about pencil 10, decals 22*a* and 22*b* meet one another and may be evenly aligned due to the fact that they are mirror images of one another. Because the entire adhesive layer 26 is covered by another portion of blank 20, a decorative tag (in this case a flower) is formed that adorns pencil 10. With proper alignment, the result is a neat appearance because all portions of second adhesive side 25 are covered. The decorative tag is offset from central axis A of pencil 10. In a cylindrical object such as pencil 10, axis A is a line that interconnects the center points of circles formed when a right plane intersects the cylinder. Blank 20 can be affixed at any point along the length of the pencil. Moreover, multiple stickers 20 can be used with one pencil so that additional tags are displayed on pencil 10.

Figure 3:
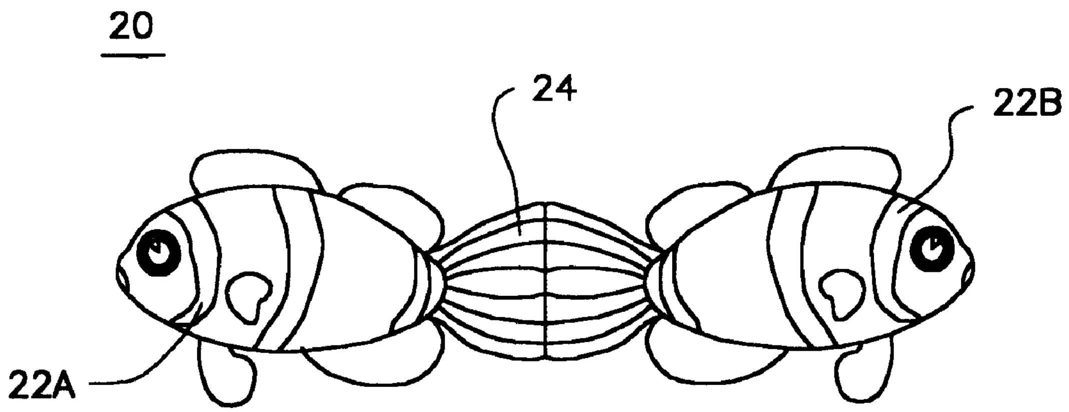
FIG. 3 is a front view of an ornamental adhesive blank according to another embodiment of the invention.

With reference to FIG. 3, bridge 24 may also form part of the decorative features of blank 20. In this instance, the tailfin of a fish is represented by bridge 24. Preferably, in any of the embodiments described herein, the length of bridge 24 approximates the circumference of a standard pencil. This length is typically about one inch. In turn, when blank 20 is used with an object having this circumference, entire decals 22*a* and 22*b* can be displayed. However, it should be understood that blank 20 is not limited to use with a writing implement such as a pencil, pen, marker or similarly sized object. For example, blank 20 can be wrapped around belt loops, key chains, and shoe laces. Moreover, bridge 24 can be sized so that it can be wrapped around objects having circumferences that are larger or smaller than a standard pencil. In turn, blank 20 can be used with articles such as chair legs and the like. Also, the design of bridge 24 may take advantage of the bulge created when blank 20 is wrapped around an article to create representations of various objects.

Figure 4:
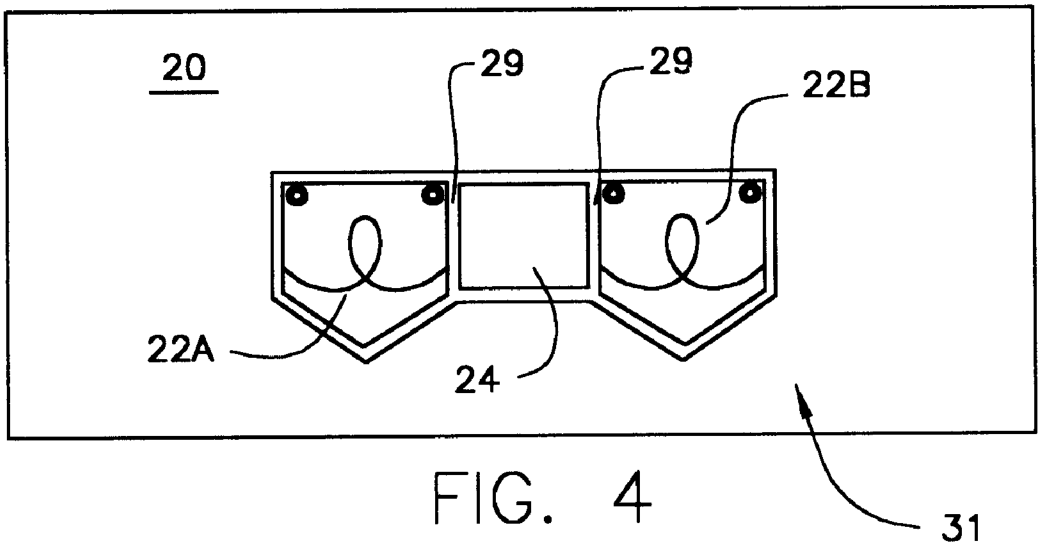
FIG. 4 is a front view of an ornamental adhesive blank according to another embodiment of the invention.

In one embodiment, as illustrated in FIG. 4, scored lines 29 are disposed on either side of bridge 24. Thus, when used to decorate an object whose circumference is nearly the same as the length as bridge 24, decals 22*a* and 22*b* can be more easily affixed to one another. Moreover, the scored lines help to improve appearance by causing there to be a crisp break between decals 22*a* and 22*b* and bridge 24.

Figure 5:
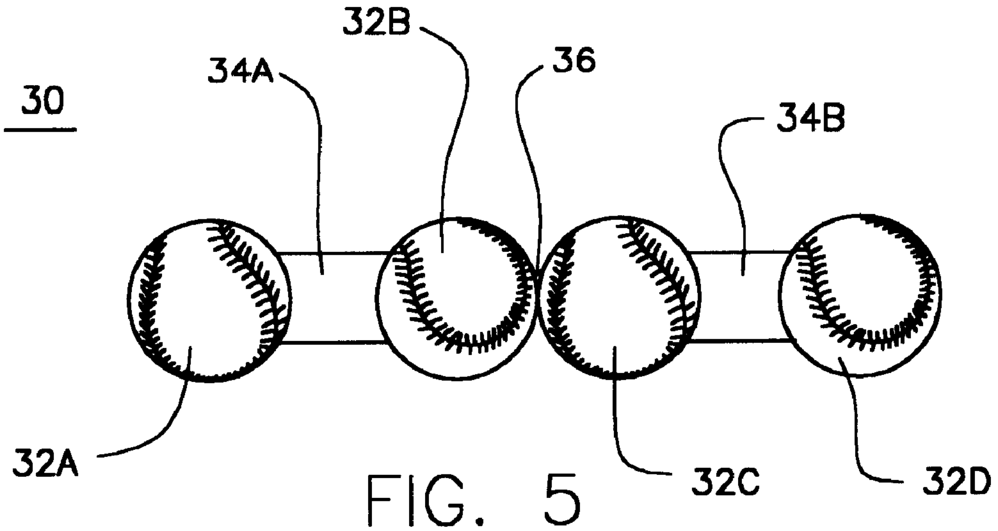
FIG. 5 is a front view of an ornamental adhesive blank according to another embodiment of the invention.

In another embodiment, as illustrated in FIG. 5, an ornamental adhesive blank 30 is configured so that two decorative tags are formed when blank 30 is wrapped about an object. Specifically, this sticker includes a first left decal 32*a*, a first bridge 34*a*, and a first right decal 32*b* similarly configured to the originally described blank 20 that is shown in FIG. 2. Blank 30 also includes a second left decal 32*c*, a second bridge 34*b*, and a second right decal 32*d*. This portion is also similar to the originally described blank 20 that is shown in FIG. 2 and in shaped so as to mirror the other portion described above. In this embodiment, edges 36 of first right decal 32*b* and second left decal 32*c* are joined to one another to form one sticker having four decals and two bridges.

Figure 6:
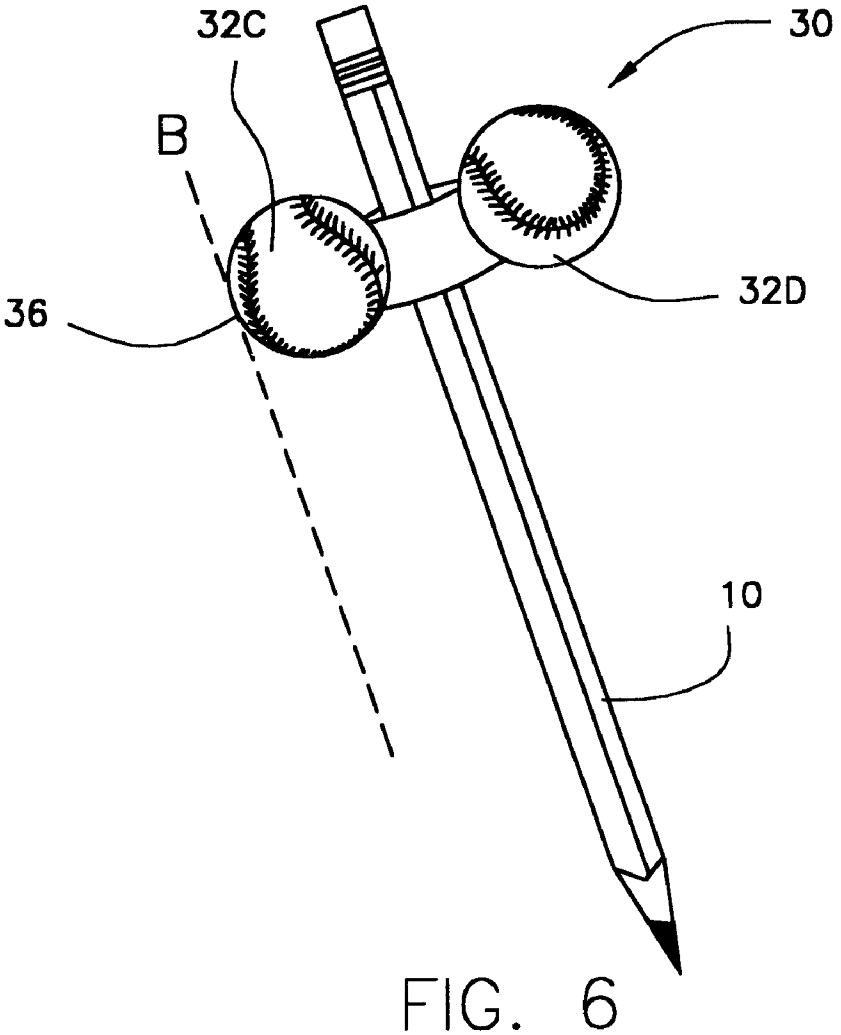
FIG. 6 is a perspective view of the ornamental adhesive blank shown in FIG. 5 affixed to a pencil.

With continued reference to FIG. 5, the first step in attaching blank 30 to an object is to fold first right decal 32*b* onto second left decal 32*c* so that they are affixed to one another. In one embodiment, in order to simplify this first step, the line where edges 36 meet is scored. An object such as pencil 10, shown in FIG. 6, is placed between bridges 34*a* and 34*b* such that the object is centered along bridges 34*a* and 34*b* and generally perpendicular to blank 30. Bridges 34*a* and 34*b* are then affixed to the object. In the instance where the circumference of the object is less than the combined lengths of bridges 34*a* and 34*b*, overlap portions of bridges 34*a* and 34*b* are affixed to one another. Lastly, decals 32*a* and 32*d* are affixed to one another. Blank 30 is shown affixed to pencil 10 in FIG. 6.

Figure 7A:
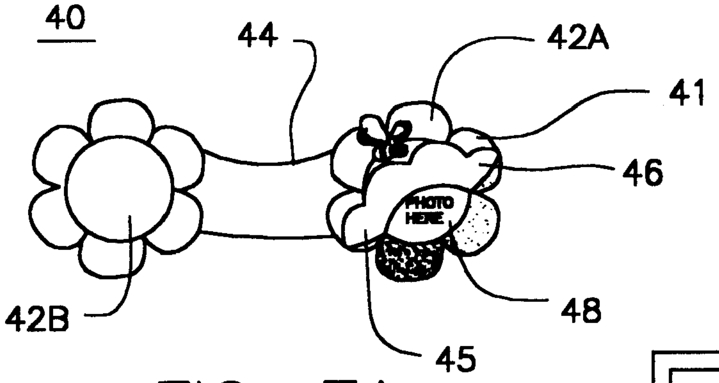
FIG. 7*a* is a front view of an ornamental adhesive blank configured to hold an image blank according to one embodiment of the invention.
Figure 7B:
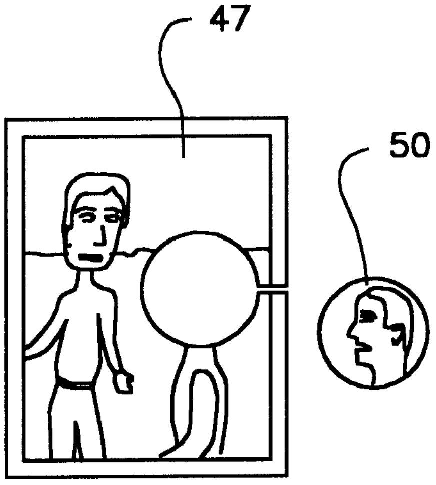
FIG. 7*b* illustrates an image blank that has been cut from a photograph according to one embodiment of the invention.
Figure 8:
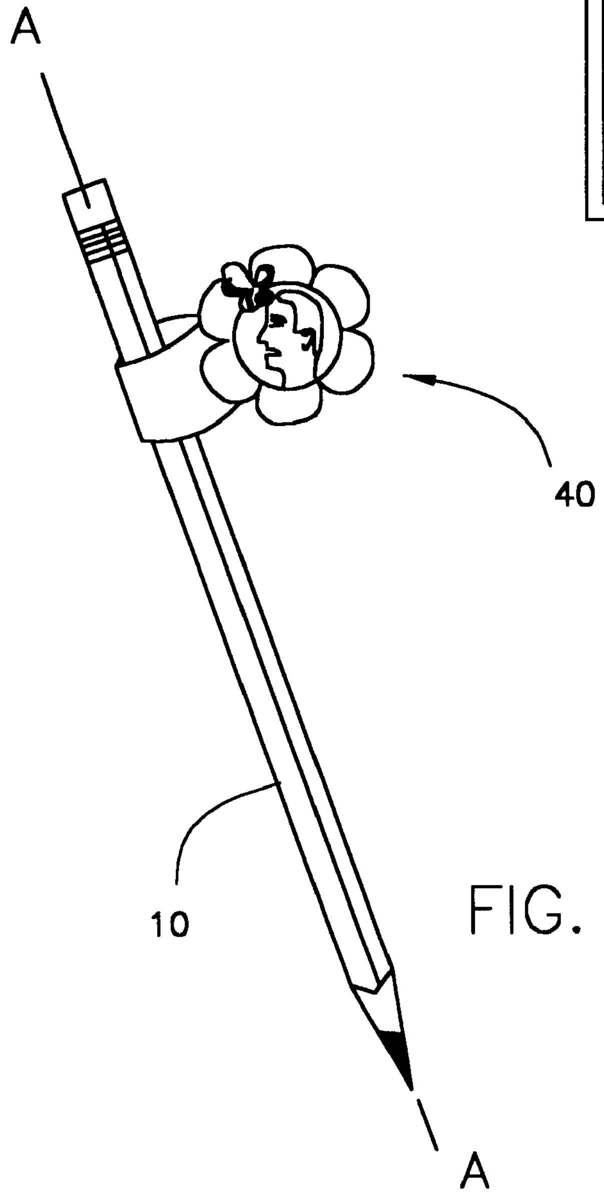
FIG. 8 is a is a perspective view of the ornamental adhesive blank shown in FIG. 7*a* affixed to a pencil and holding the image blank shown in FIG. 7*b* according to one embodiment of the invention.

In yet another embodiment, as illustrated in FIG. 7*a*, an ornamental adhesive blank. 40 is shown that is configured to display an image blank 50 that may be supplied with blank 40 or supplied by the user. In the preferred embodiment, as shown in FIG. 7*b*, image blank 46 is cut from a photograph 47. Analogous to adhesive blank 20 shown in FIG. 2, adhesive blank 40 consists of three portions: a first decal 42*a*, a second decal 42*b*, and a bridge portion 44. In this instance, first decal 42*a* is further die-cut so that an opening 48 is formed therethrough. The two surfaces of blank 40 are a first ornamental side 41 and a second adhesive side 45. As shown, the shape of first decal 42*a* is a mirror image of the shape of second decal 42*b*. In one embodiment, blank 40 includes an adhesive layer 46 over the entire surface of second adhesive side 45. In another embodiment, adhesive layer 46 does not cover bridge 44. In another embodiment, adhesive layer 26 covers only second decal 42*b*.

With continued reference to FIG. 7*a*, the first step in attaching blank 40 to an object is to remove protective backing 48 from sheet 41 to expose adhesive layer 46. Image blank 50 is then attached to adhesive side 45 of second decal 42*b* in a position that will allow it to be seen through opening 48. Central bridge portion 44 is then applied to the object such as pencil 10 in FIG. 1. Upon wrapping bridge 44 about pencil 10, decals 42*a* and 42*b* meet one another and may be evenly aligned due to the fact that they are mirror images of one another. A decorative tag including image blank 50 is formed that is offset from central axis A of pencil 10. Blank 40 can be affixed at any point along the length of the pencil. Moreover, multiple stickers 40 can be used with one pencil so that additional tags are displayed on pencil 10.

It will be understood that each of the elements described above, or two or more together, may also find a useful application in other types of constructions differing from the types described above.

Thus, while there have been shown and described and pointed out fundamental novel features of the invention as applied to alternative embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto. It is to be understood that the drawings are not necessarily drawn to scale, but that they are merely conceptual in nature.

What is claimed is:

1. An adhesive blank of pliable sheet material for decorating an object having a central axis and having a circumferential surface area, the adhesive blank comprising:

a first bridge portion having a first end and a second end;

a second bridge portion having a first end and a second end;

a first left decal coupled to said first end of said first bridge portion;

a first right decal coupled to said second end of said first bridge portion;

a second left decal coupled to said first end of said second bridge portion and coupled to said first right decal, said second left decal formed in the shape of a mirror image of said first right decal so that when said bridge portions are wrapped about the circumferential surface area of the object, said first right decal and said second left decal contact to form a two sided ornamental decal offset from said central axis of the object; and a second right decal coupled to said second end of said second bridge portion, said second right decal formed in the shape of a mirror image of said first left decal so that when said bridge portions are wrapped about the circumferential surface area of the object, said first left decal and said second right decal contact to form a two sided ornamental decal offset from said central axis of the object.

2. An adhesive blank as described in claim 1 further comprising a first ornamental side and a second adhesive side.

3. An adhesive blank as described in claim 2 further comprising a layer of pressure-sensitive adhesive disposed on at least part of said second adhesive side.

4. An adhesive blank as described in claim 3 wherein said adhesive blank further comprises a protective backing sheet disposed atop said layer of pressure-sensitive adhesive.

5. An adhesive blank as described in claim 1 wherein said object is a writing implement.

6. An adhesive blank as described in claim 1 wherein said means for attaching comprises a hook and loop fastening.

7. An adhesive blank as described in claim 1 wherein said sticker further comprises a scored line disposed along said first and second end of said first bridge and a scored line disposed along said first and second end of said bridge.

8. An adhesive blank as described in claim 1 wherein said sticker is formed from a pliable plastic material.

9. An adhesive blank as described in claim 8 wherein said pliable plastic material is polyester.

10. An adhesive blank as described in claim 1 wherein said blank is formed from paper.

* * * * *